United States Patent
Ben-Shaul et al.

(10) Patent No.: US 8,611,894 B2
(45) Date of Patent: Dec. 17, 2013

(54) APPARATUS AND METHOD FOR DESTINATION PHONE NUMBER STRING CREATION

(75) Inventors: Itay Ben-Shaul, Kiryat Ata (IL); Baruch Eruchimovitch, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 908 days.

(21) Appl. No.: 12/538,149

(22) Filed: Aug. 9, 2009

(65) Prior Publication Data
US 2011/0034167 A1     Feb. 10, 2011

(51) Int. Cl.
*H04W 4/00*     (2009.01)

(52) U.S. Cl.
USPC ............ 455/432.1; 379/115.01; 379/115.02; 379/115.03; 379/207.14; 379/207.15; 455/405; 455/406; 455/407; 455/408; 455/461; 455/551; 455/409

(58) Field of Classification Search
USPC ........ 379/115.01, 115.02, 115.03, 69.88, 19, 379/88.21; 455/405–408, 432.1, 461, 551, 455/432.3
See application file for complete search history.

(56) References Cited

U.S. PATENT DOCUMENTS

| | | | |
|---|---|---|---|
| 6,321,098 B1 * | 11/2001 | Beith et al. | 455/564 |
| 6,473,499 B1 | 10/2002 | Ng et al. | |
| 7,623,860 B2 * | 11/2009 | Hurst | 455/432.1 |
| 7,885,661 B2 * | 2/2011 | Cai | 455/445 |
| 2001/0001000 A1 * | 5/2001 | Thomas et al. | 370/200 |
| 2006/0073808 A1 * | 4/2006 | Buchert | 455/406 |
| 2006/0229090 A1 | 10/2006 | LaDue | |
| 2007/0129078 A1 | 6/2007 | De Beer | |
| 2008/0072294 A1 | 3/2008 | Chatterjee | |
| 2008/0188227 A1 * | 8/2008 | Guedalia et al. | 455/445 |

FOREIGN PATENT DOCUMENTS

| | | |
|---|---|---|
| EP | 1107562 A1 | 6/2001 |
| GB | 2355624 A | 4/2001 |
| WO | WO02098120 A1 | 12/2002 |

OTHER PUBLICATIONS

International Search Report and Written Opinion—PCT/US2010/044430—International Search Authority, European Patent Office, Feb. 1, 2011.

* cited by examiner

*Primary Examiner* — Olumide T Ajibade Akonai
*Assistant Examiner* — Edward Zhang
(74) *Attorney, Agent, or Firm* — Fariba Yadegar-Bandari

(57) ABSTRACT

A method and apparatus facilitating access to a communication session for a client is provided. The method may comprise obtaining one or more call plan proposals, receiving a destination phone number for making a call on a wireless communications device (WCD) when the WCD is in a source country, determining the source country from which the call is to be made, determining a destination country code of the destination phone number, identifying each of the one or more call plan proposals available to the WCD in the source country, selecting a call plan proposal from the identified available call plan proposals, generating a destination number string, and executing the call using the destination number string. The destination number string can comprise the destination phone number combined with the destination country code and the country access code and the discount identifier code of the selected call plan proposal.

36 Claims, 8 Drawing Sheets

| Source Country Code 402 | Country Access Code 404 | Discount Identifier 406 | Security code 408 | Destination Country Code 410 | Destination Number 412 |
|---|---|---|---|---|---|
| 972 | 8085551313? | 123456789#? | 9876#? | 33 | 8585551234# |

400

APPARATUS AND METHOD FOR DESTINATION PHONE NUMBER STRING CREATION

BACKGROUND

The present application relates generally to wireless communications, and more specifically to methods and systems for making calls from a wireless communications device in a source country outside of a home country.

Wireless communication systems are widely deployed across multiple countries to provide various types of communication (e.g., voice, data, multimedia services, etc.) to multiple users. Examples of such communication systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

A wireless local communication system can support communications for non-local wireless communication devices (WCDs). In one aspect, a WCD may be considered a non-local WCD when the WCD is attempting to place a call from a source country that is different than the WCD home country. Furthermore, such supported communications may be provided to the non-local WCD at an increased cost. Service providers may provide calling plan options for use by a non-local WCD to aid in mitigating any increased cost. Although access to such plans often can involve inputting multiple strings of numbers for each call made. Additionally, address book functionality on a WCD generally allows user simple access to commonly used phone numbers. Thus, improved apparatus and methods for making calls from a wireless communications device in a source country outside of a home country are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with making calls from a wireless communications device in a source country outside of a home country.

According to one aspect, a method for making calls from a wireless communications device in a source country outside of a home country is provided. The method can comprise obtaining one or more call plan proposals associated with one or more service providers, wherein each of the one or more call plan proposals includes a call price, a country access code, and a discount identifier code. The method further includes receiving a destination phone number for making a call on the wireless communications device (WCD) when the WCD is in the source country. Furthermore, the method includes determining the source country from which the call is to be made, wherein the source country corresponds to the current country location of the WCD. Further included is determining a destination country code of the destination phone number and identifying each of the one or more call plan proposals available to the WCD in the source country, wherein each of the one or more call plan proposals comprises a plan-specific discount identifier code. The method further includes selecting a call plan proposal from the identified available call plan proposals and generating a destination number string comprising the destination phone number combined with the destination country code and the country access code and the discount identifier code of the selected call plan proposal, and executing the call using the destination number string.

Another aspect relates to at least one processor configured to make calls from a wireless communications device in a source country outside of a home country. The at least one processor can include a first module for obtaining one or more call plan proposals associated with one or more service providers, wherein each of the one or more call plan proposals includes a call price, a country access code, and a discount identifier code. The at least one processor can further include a second module for receiving a destination phone number for making a call on the wireless communications device (WCD) and a third module for determining the source country from which the call is to be made, wherein the source country corresponds to the current country location of the WCD. Furthermore, the at least one processor can include a fourth module for determining a destination country code of the destination phone number and a fifth module for identifying each of the one or more call plan proposals available to the WCD in the source country, wherein each of the one or more call plan proposals comprises a plan-specific discount identifier code. The at least one processor can further include a sixth module for selecting a call plan proposal from the identified available call plan proposals and a seventh module for generating a destination number string comprising the destination phone number combined with the destination country code and the country access code and the discount identifier code of the selected call plan proposal. The at least one processor can further include an eighth module for executing the call using the destination number string.

Still another aspect relates to a computer program product comprising a computer-readable medium. The computer-readable medium can include at least one instruction for causing a computer to obtain one or more call plan proposals associated with one or more service providers, wherein each of the one or more call plan proposals includes a call price, a country access code, and a discount identifier code, at least one instruction for causing the computer to receive a destination phone number for making a call on the wireless communications device (WCD). The computer-readable medium can further include at least one instruction for causing the computer to determine the source country from which the call is to be made, wherein the source country corresponds to the current country location of the WCD. The computer-readable medium can further include at least one instruction for causing the computer to determine a destination country code of the destination phone number. Additionally, the computer-readable medium can include at least one instruction for causing the computer to identify each of the one or more call plan proposals available to the WCD in the source country, wherein each of the one or more call plan proposals comprises a plan-specific discount identifier code. The computer-readable medium can further include at least one instruction for causing the computer to select a call plan proposal from the identified available call plan proposals and at least one instruction for causing the computer to generate a destination number string comprising the destination phone number combined with the destination country code and the country access code and the discount identifier code of the selected call plan proposal. The computer-readable medium can further include at least one instruction for causing a computer to execute the call using the destination number string.

Yet another aspect relates to an apparatus. The apparatus can include means for obtaining one or more call plan proposals associated with one or more service providers, wherein each of the one or more call plan proposals includes a call price, a country access code, and a discount identifier code, and means for receiving a destination phone number for making a call on the wireless communications device (WCD). The apparatus can further include means for determining the source country from which the call is to be made, wherein the source country corresponds to the current country location of the WCD and means for determining a destination country code of the destination phone number. The apparatus can additionally include means for identifying each of the one or more call plan proposals available to the WCD in the source country, wherein each of the one or more call plan proposals comprises a plan-specific discount identifier code, and means for selecting a call plan proposal from the identified available call plan proposals. The apparatus can further include means for generating a destination number string comprising the destination phone number combined with the destination country code and the country access code and the discount identifier code of the selected call plan proposal, and means for executing the call using the destination number string.

Another aspect relates to another apparatus. The apparatus can include a storage module and a processor coupled to the storage module. The processor is operable for obtaining one or more call plan proposals associated with one or more service providers, wherein each of the one or more call plan proposals includes a call price, a country access code, and a discount identifier code. The apparatus can further include a user interface coupled to the processor and the storage module operable for receiving a destination phone number for making a call on the wireless communications device (WCD). The processor is further operable for determining a destination country code of the destination phone number, identifying each of the one or more call plan proposals available to the WCD in the source country, wherein each of the one or more call plan proposals comprises a plan-specific discount identifier code, selecting a call plan proposal from the identified available call plan proposals, and generating a destination number string comprising the destination phone number combined with the destination country code and the country access code and the discount identifier code of the selected call plan proposal, and executing the call using the destination number string.

Furthermore, in accordance with one or more aspects and corresponding disclosure thereof, various aspects are described in connection with facilitating calls from a wireless communications device. According to one aspect, a method for facilitating calls from a wireless communications device is provided. The method can include receiving from a user, one or more call plan proposals associated with one or more service providers, wherein each of the one or more call plan proposals includes a call price, a country access code, and a discount identifier code. The method further includes generating a call plan proposal database from the received call plan proposals, wherein the database is indexed by source country, and transmitting information associated with the call plan proposal database to a WCD for access when the WCD is in a source country.

Another aspect relates to at least one processor configured to facilitate calls from a wireless communications device. The at least one processor can include a first module for receiving from a user, one or more call plan proposals associated with one or more service providers, wherein each of the one or more call plan proposals includes a call price, a country access code, and a discount identifier code. The at least one processor can further include a second module for generating a call plan proposal database from the received call plan proposals, wherein the database is indexed by source country, and a third module for transmitting information associated with the call plan proposal database to a WCD for access by the WCD when the WCD is in a source country.

Still another aspect relates to a computer program product comprising a computer-readable medium. The computer-readable medium can include at least one instruction for causing a computer to receive, from a user, one or more of call plan proposals associated with one or more service providers, wherein each of the one or more call plan proposals includes a call price, a country access code, and a discount identifier code. The computer-readable medium can further include at least one instruction for causing a computer to generate a call plan proposal database from the received call plan proposals, wherein the database is indexed by source country. Furthermore, the computer-readable medium can include at least one instruction for causing a computer to transmit information associated with the call plan proposal database to a WCD for access by the WCD when the WCD is in a source country.

Yet another aspect relates to an apparatus. The apparatus can include means for receiving, from a user, one or more call plan proposals associated with one or more service providers, wherein each of the one or more call plan proposals includes a call price, a country access code, and a discount identifier code. The apparatus can further include means for generating a call plan proposal database from the received call plan proposals, wherein the database is indexed by source country, and means for transmitting information associated with the call plan proposal database to a WCD for access by the WCD when the WCD is in a source country.

Another aspect relates to another apparatus. The apparatus can include a storage module, a receiver coupled to the storage module, a processor coupled to the storage module, and a transmitter coupled to the storage module. The storage module is operable for receiving, from a user, one or more call plan proposals associated with one or more service providers, wherein each of the one or more call plan proposals includes a call price, a country access code, and a discount identifier code. The processor is operable for generating a call plan proposal database from the received call plan proposals, wherein the database is indexed by source country. The transmitter is operable for transmitting information associated with the call plan proposal database to a WCD for access by the WCD when the WCD is in a source country.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, a wireless communications device (WCD) attempting to make calls in a source country outside of a home country may use one or more call plan proposals provided by one or more service providers in an effort to mitigate call costs. Further, in one aspect, a WCD may use an associated address book to obtain a destination phone number to be dialed in combination with a selected call plan proposal. In one aspect, such call plan proposals may be inputted into the WCD and/or an associated computing device during an off-line phase, prior to initiating a call in a source country different than the home country. As such, a user may make calls from a source country different than the WCD home country without contemporaneously inputting codes associated with a call plan proposal. Still further, a user may use an address book function of the WCD in the source country different than the WCD home country without contemporaneously inputting additional source and/or destination country specific codes.

In the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Figure 1:
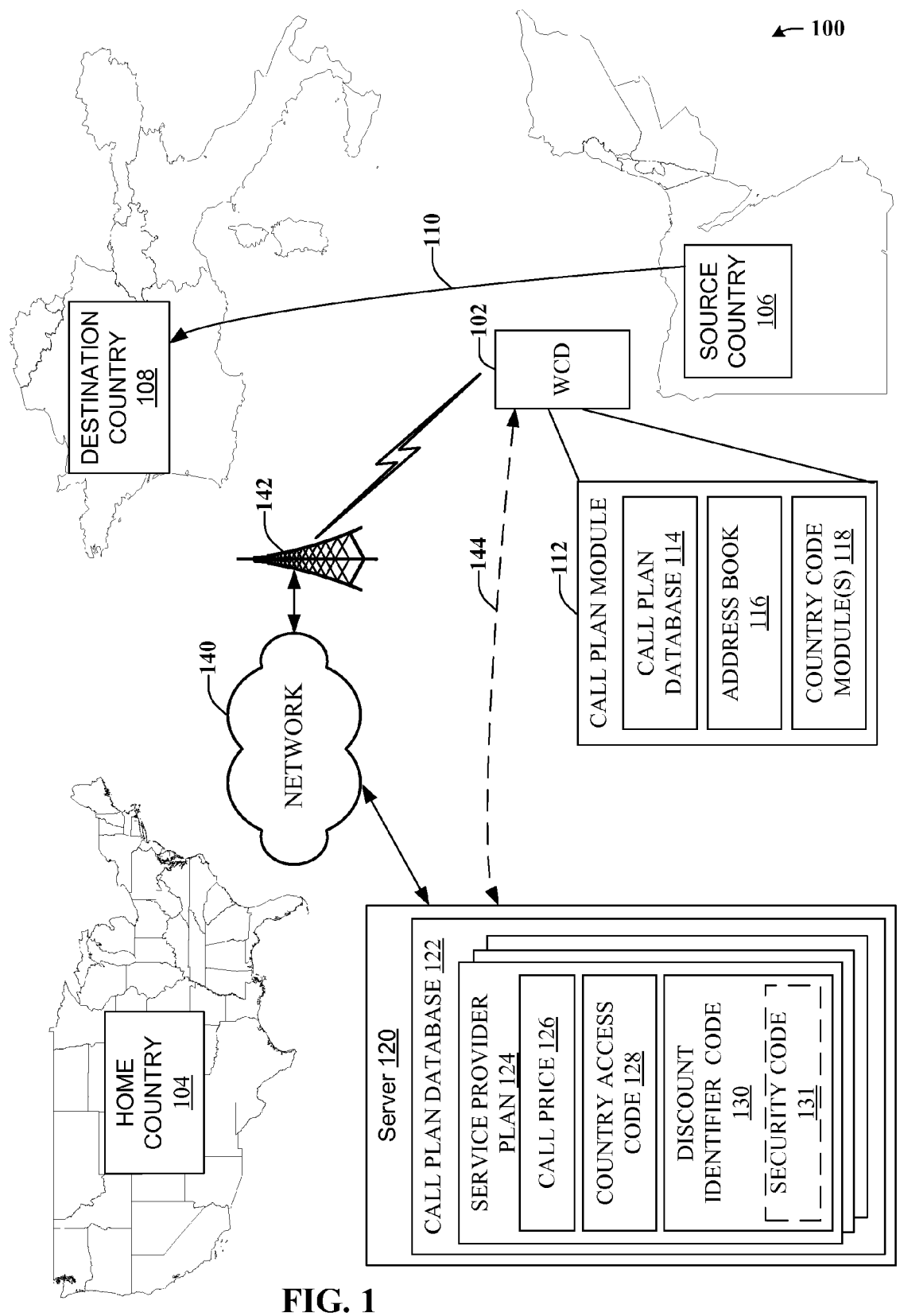
FIG. 1 illustrates a block diagram of an exemplary communication system that can facilitate making calls from a wireless communications device in a source country outside of a home country, according to one aspect.

With reference now to FIG. 1, an exemplary system 100 capable of facilitating making calls from a wireless communications device in a source country outside of a home country is depicted. Generally, system 100 can include wireless communications device (WCD) 102, network 140 and server 120. In one aspect, WCD 102 may be associated with service from a home country 104, may be located in a source country 106, and may attempt to place a call 110, to a destination country 108. Although the terms home, source and destination are described with reference to countries, one of ordinary skill in the art would understand the proposed apparatus and methods may be equally applicable with reference to other delineations, such as but not limited to, regions, unions, territories, or any other local area in which a WCD may be treated as a non-local WCD. Furthermore, in one aspect, WCD 102 may include a call plan module 112 to facilitate making calls in a source country outside of a home country. Call plan module 112 may further include call plan database 114, address book 116, and/or one or more country code modules 118.

In one aspect, call plan database 114 may include one or more call plan proposals. Such call plan proposals may be obtained from user input, and/or through communication with server 120. For example, call plan proposals may be inputted via WCD 102 and/or server 120 coupled to a computing device or the like. Such inputs may occur during an off-line phase prior to initiating a call. Inputted call plan proposals may be stored in WCD call plan database 114 and/or in server call plan database 122. Furthermore, call plan database 114, 122 may include service plan provider specific plans 124. Each call plan proposal may include a call price 126, such as a charge per unit of time, a country access code 128, a discount identifier code 130, etc. Further, in some aspects, a call plan proposal may further include a security code 131 associated with at least the discount identifier 130. In one aspect, a specific discount identifier 130 may be unique to a specific service plan provider 124, which may in turn provide call plan proposals for multiple source countries. Country access code 128 may be unique to each service provider and a source country 106. In operation, call plan database 122 may be communicated to WCD 102 through network 140, through a direct communication link 144, through a wireless network 142, etc.

Address book 116 may include numbers associated with specific contacts, stored on the WCD 102 and/or a server 120 to facilitate efficient calls to said contacts. In one aspect, address book 116 may include additional information relating to a contact, such as but not limited to, a destination country code, etc.

Country code module 118 may aid call plan module 112 in obtaining a source country code, and/or a destination country code. In one aspect, country code module 118 may further identify call plan proposals available in a source country, and determine which of the call plan proposals are available for calling from a WCD. In another aspect, determining a source country may include obtaining a country mapping table having a name of the source country mapped to an International Country Code (ICC), obtaining a cellular network identification (CNID) mapping table, having the ICC mapped to one or more CNIDs corresponding to the source country, obtaining CNID data from a base station available to the WCD, such as base station 142, and determining the source country from the CNID data mapped to the ICC and further be mapped to the source country. In another aspect, country code module 118 may further identify call plan proposals available to communicate with a destination country.

Additionally or in the alternative, WCD 102 may be enabled to perform multiple party, or conference calls. In such an aspect, WCD 102 may receive a second destination phone number, determine a second destination country code through country code module 118, select a call plan proposal through call plan module 112, generate a second string of numbers from at least the destination phone number, selected call plan and country code information, and may execute the second call. Addition of further parties to a multiple party call follows a substantially similar process.

Figure 2:
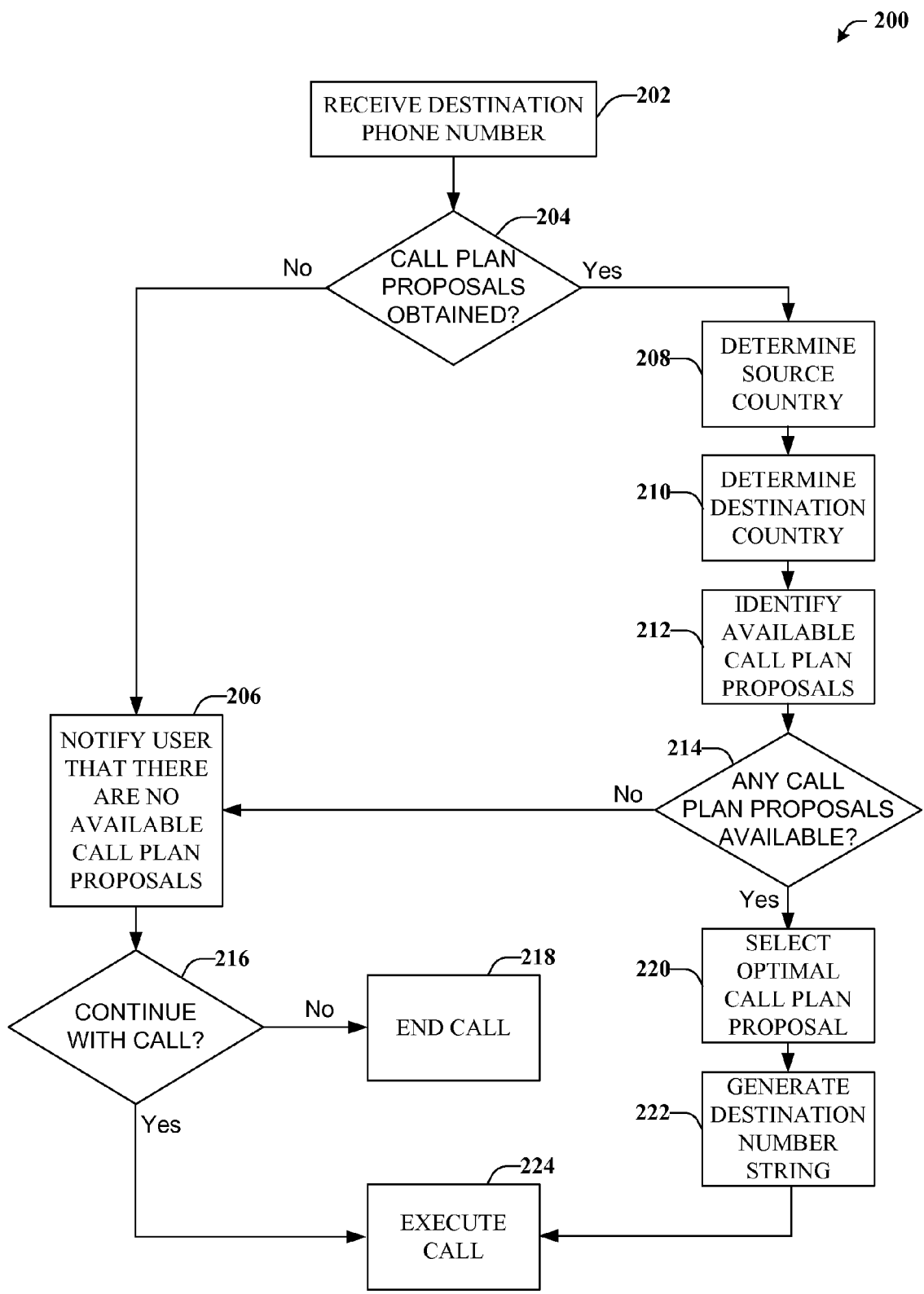
FIG. 2 depicts an exemplary method for making calls from a wireless communications device in a source country outside of a home country, according to another aspect.

FIG. 2 illustrates various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 2, exemplary method 200 for making calls from a wireless communications device in a source country outside of a home country is illustrated, according to one aspect. Generally, at reference numeral 202, a WCD receives a destination phone number. In one aspect, this number may be inputted by a user through a user interface associated with a WCD. In another aspect, this number may be obtained from an address book associated with a WCD. Next to be described, at reference numeral 204, it is determined whether one or more call plan proposals have been obtained by a WCD. In one aspect, the call plan proposals may be obtained during an offline process in which one or more call plan proposals are inputted and made available for subsequent access without the need to re-enter the call plan proposal information during the subsequent access.

If at reference number 204, no call plan proposals are available, then at reference numeral 206, a user may be notified accordingly. If at reference number 204, one or more call plan proposals are available, then at reference numeral 208 a source country is determined. In one aspect, determining a source country may include obtaining a country mapping table having a name of the source country mapped to an International Country Code (ICC), obtaining a cellular network identification (CNID) mapping table having the ICC mapped to one or more CNIDs corresponding to the source country, obtaining CNID data from a base station available to the WCD, such as base station 142, and determining the source country from the CNID data mapped to the ICC and further mapped to the source country. In another aspect, source country code information may be included in a received signal from a local base station. In yet another aspect, a user may provide the applicable source country code.

At reference numeral 210, a destination country code is determined. In one aspect, an address book coupled to the WCD may include a destination country code for a destination phone number. In another aspect, a destination country code may be inferred by the WCD through characteristics associated with the destination phone number. In yet another aspect, a user may provide the applicable destination country code, for example, upon input of the destination number or in response to a menu prompt.

At reference numeral 212, available call plan proposals may be identified. In one aspect, information related to the one or more call plan proposals such as but not limited to, call price, pre-paid minutes, availability in source country, etc. may be obtained. In another aspect, potential call plan proposals may be determined with reference to received signals from a base station. For example, a WCD may obtain such information over a common channel, such as in a message received via a pilot channel or a paging channel from an active base station.

At reference numeral 214, it is determined whether any call plan proposals are available for the WCD in the determined source country that may be used to connect to the determined destination country. If at reference numeral 214, it is determined no call plan proposals are available, then at reference numeral 206 a user may be notified accordingly. In one aspect, at reference numeral 216, a prompt to determine whether the call should be continued is provided. If at reference numeral 216, it is determined that the call should not be continued, then at reference numeral 218 the call process is terminated. For example, the prompting provided at reference numeral 216 may include a prompt for user input, may include a default setting that may be modified by a user selection, etc.

By contrast, if at reference numeral 214, one or more call plan proposals are available, then at reference numeral 220, a call plan proposal may be selected. In one aspect, the selection may be based at least in part on one or more of the call price, any pre-paid minutes available with a plan, a signal strength for a local base station related to a call plan, a quality of service metric for a call plan related to a local base station, etc. In another aspect, a user may select among a list of potential call plan proposals. In yet another aspect, a default setting may allow WCD to automatically select a call plan proposal.

At reference numeral 222, the selected call plan proposal information may be combined with the source country code, destination country code and destination phone number to generate a destination number string. In one aspect, the destination number string may include inserting one or more pauses within the destination number string. At reference numeral 224, the WCD executes a call. In one aspect, the call is executed through use of the generated destination number string. In such an aspect, inserted pauses may correspond to prompts, such as a menu on a user interface directed to the user, or such as a trigger directed to the WCD to automatically enter a remaining portion of the generated destination number string, in order to complete the intended call to the destination phone number.

Figure 3:
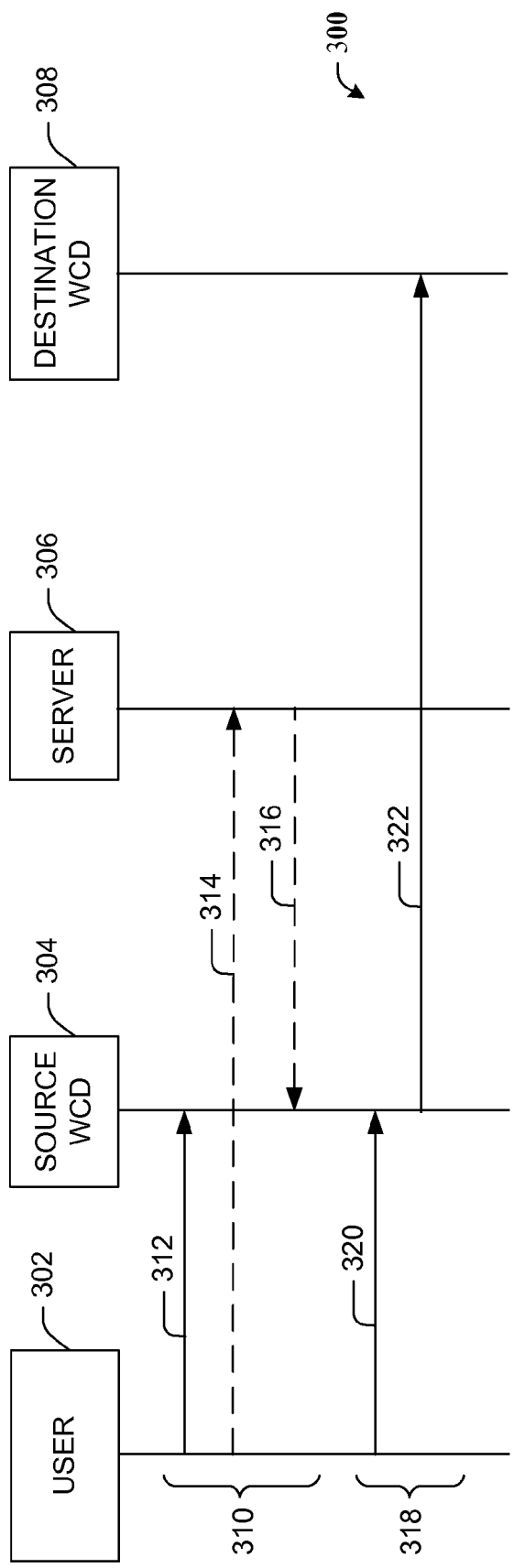
FIG. 3 is a call flow diagram of an aspect of a call flow of the system of FIG. 1, according to one aspect.

Referring to FIG. 3, in one non-limiting aspect, a call flow 300 details interactions between various components of a communication system that can facilitate making calls from a wireless communications device in a source country outside of a home country, such as system 100 (FIG. 1), is provided. In this example, user 302 may be able to communicate with wireless communications device (WCD) 304 and server 306, which may allow user 302 to make calls from WCD 304 in a source country outside of a home country to destination WCD 308 in a destination country. In one aspect, the source and destination country may be the same country. While in another aspect, the home and destination country may be the same country. Furthermore, for sake of illustrating call flow 300, the call flow may be sub-divided into two activities;

off-line call plan proposal gathering 310, online destination phone number processing 318.

Figure 5:
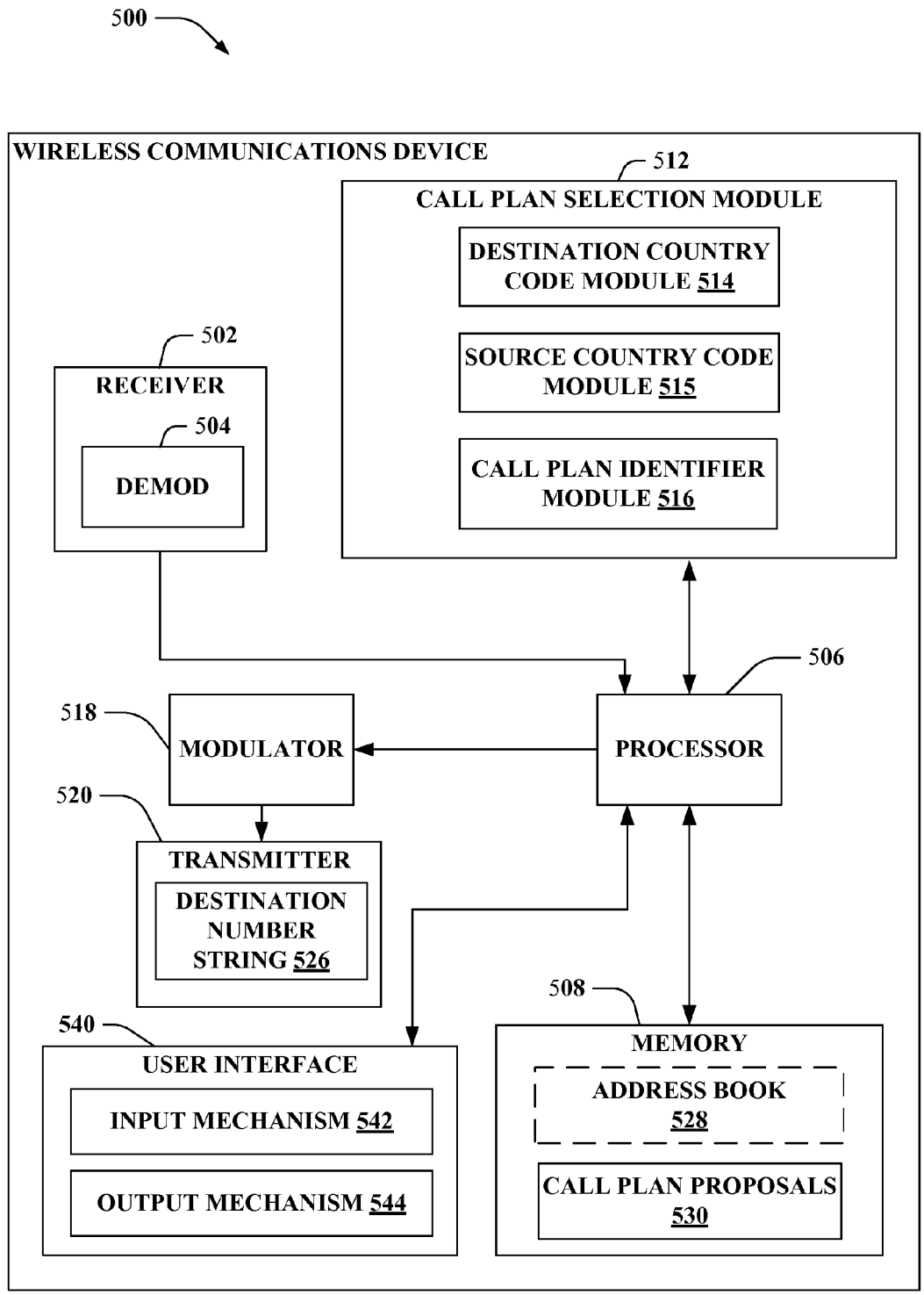
FIG. 5 depicts a block diagram of an exemplary wireless communications device that can facilitate making calls in a source country outside of a home country, according to one aspect.

In one aspect, during off-line call plan proposal gathering 308, at acts 310 and 312, user 302 may populate a database or the like with potential call plan proposal options. In one aspect, at act 312, user 302 may input call plan proposals for storage and/or later retrieval from source WCD 304. Additionally, or in the alternative, at act 314, user 302 may input call plan proposals to server 306. In such an aspect, user 302 may communicate directly with a server, and/or may communicate with server 306 through a computing device coupled to the server via a network, such as depicted in FIG. 5. Thereafter, at act 316, server 306 may relay call plan proposals to source WCD for storage and/or subsequent accessing.

For example, in operation, during the off-line call plan proposal gathering 308, a user may input information associated with a call plan, such as but not limited to, a call plan price, such as 2 dollars a minute, and a service provider discount identifier code and a security code, if applicable, such as 123456789# as a discount identifier with 9876# as a security code. Furthermore, a user may input a destination numbers into an accessible address book associated with the WCD, such as 8585551234, for example.

In one aspect, during on-line destination phone number processing 318, at acts 320 and 322, user 302 may attempt to place a call to destination WCD 308. At act 320, a user may input a destination phone number. Source WCD may then process the destination phone number along with additional derived values to generate a destination number string. An exemplary destination number string is described with reference to FIG. 4. Said additional derived values may include a destination country code, a source country code, a country access code, a discount code, a security code, or any combination thereof. Said destination number string may be used to place a call to destination WCD at act 308.

Figure 4:
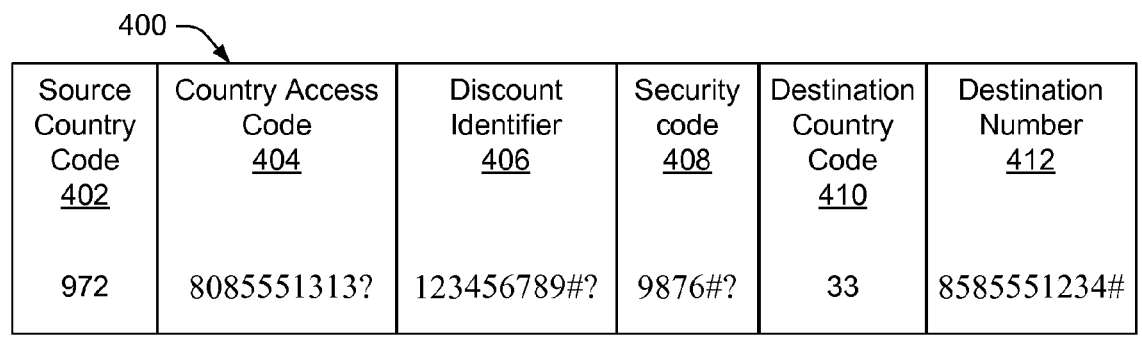
FIG. 4 depicts an exemplary destination number string generated according to an aspect.

With reference to FIG. 4, an exemplary destination number string 400 is presented, according to one aspect. Continuing the example introduced above, the WCD may determine a destination country code (such as 33 for France), a source country code (such as 972 for Israel), a country access code for a selected service provider (such as 8085551313), and a discount code and possibly a security code for the selected service provider call plan, such as described above. Furthermore, in one example, pauses may be accounted for through inclusion of characters, such as a "?" into the destination number string to prompt a user to provide information and/or an input. As such, in the above described example, if a user, with a home country of the United States, was attempting to make a call while in Israel to a French destination number 8585551234, the resulting destination number string may be as follows, "9728085551313?123456789#?9876#?338585551234#." In other words, as depicted in FIG. 4, an exemplary destination number string 400 may arrange various obtained numbers and/or codes into the following order: "source county code 402," "service provider country access code 404," "discount identifier 406," "applicable security code (if any) 408," "destination country code 310," and "destination number 412."

With reference now to FIG. 5, an illustration of a wireless communications device 500 that facilitates making calls in a source country outside of a home country is presented, according to one aspect. Client device 500 comprises receiver 502 that receives a signal from, for instance, a receive antenna (not shown), performs typical actions on (e.g., filters, amplifies, downconverts, etc.) the received signal, and digitizes the conditioned signal to obtain samples. Receiver 502 can comprise a demodulator 504 that can demodulate received symbols and provide them to a processor 506 for channel estimation. Processor 506 can be a processor dedicated to analyzing information received by receiver 502 and/or generating information for transmission by transmitter 520, a processor that controls one or more components of client device 500, and/or a processor that both analyzes information received by receiver 502, generates information for transmission by transmitter 520, and controls one or more components of client device 500. In one aspect, destination number string 526 may be transmitted by transmitter 520. As described above, in such an aspect, destination number string 526 may include, a destination phone number combined with a destination country code, a country access code and a discount identifier code of a selected call plan proposal.

Client device 500 can additionally comprise memory 508 that is operatively coupled to processor 506 and that can store data to be transmitted, received data, information related to available channels, data associated with analyzed signal and/or interference strength, information related to an assigned channel, power, rate, or the like, and any other suitable information for estimating a channel and communicating via the channel. Memory 508 can additionally store protocols and/or algorithms associated with estimating and/or utilizing a channel (e.g., performance based, capacity based, etc.). In one aspect, memory may include address book 528 and call plan proposals 530. In such an aspect, address book 528 may include one or more destination phone numbers stored with reference to specific individuals and may include further information such as a destination country code, possible available call plans, etc. Further, call plan proposals 530 may include one or more stored calling plan options including information such as, but not limited to, a call plan price, a country access code, and a discount identifier code, etc. Additionally, in one aspect, call plan proposals 530 may be associated with one or more service providers. In such an aspect, discount identifier codes may be linked to specific service providers.

It will be appreciated that the data store (e.g., memory 508) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 508 of the subject systems and methods is intended to comprise, without being limited to, these and any other suitable types of memory.

Client device 500 can further comprise a call plan selection module 512 to facilitate making calls in a source country outside of a home country. Call plan selection module 512 may further include destination country code module 514 to assist in determining the destination country code for the applicable destination phone number. In one aspect, the address book 528 may include the destination country code for the destination phone number. Call plan selection module 512 may further include source country code module 515 to assist in determining the source country code for the current location of a WCD. In one aspect, source country code module 515 may include logic operable for obtaining a country mapping table having a name of the source country mapped to an International Country Code (ICC), obtaining a cellular network identification (CNID) mapping table having the ICC mapped to one or more CNIDs corresponding to the source country, obtaining CNID data from a base station available to the WCD, and determining the source country from the CNID data mapped to the ICC and further mapped to the source country. Call plan selection module 512 may further include call plan identifier module 516 to assist in selecting the call plan available to complete a call to a destination phone number. In one aspect, call plan identifier module 516 may identify call plan proposals 530 available in the source country, and determine which of the available call plan proposals is able to currently communicate with the WCD. In another aspect, call plan identifier module 516 may identify call plan proposals available to communicate with the destination country. Further, in one aspect, selecting a call plan may be determined with respect to at least one of a user selection, the least expensive call price, the call plan proposal with prepaid call time available, the call plan proposal supported through the strongest signal strength, or any combination thereof. Still further, call plan selection module 512 may be operable to facilitate conference calls or the like with a plurality of destination phone numbers.

Additionally, mobile device 500 may include user interface 540. User interface 540 may include input mechanisms 542 for generating inputs into wireless device 500, and output mechanism 542 for generating information for consumption by the user of the wireless device 500. For example, input mechanism 542 may include a mechanism such as a key or keyboard, a mouse, a touch-screen display, a microphone, etc. Further, for example, output mechanism 544 may include a display, an audio speaker, a haptic feedback mechanism, a Personal Area Network (PAN) transceiver, etc. In the illustrated aspects, the output mechanism 544 may include a display operable to present media content that is in image or video format or an audio speaker to present media content that is in an audio format.

Figure 6:
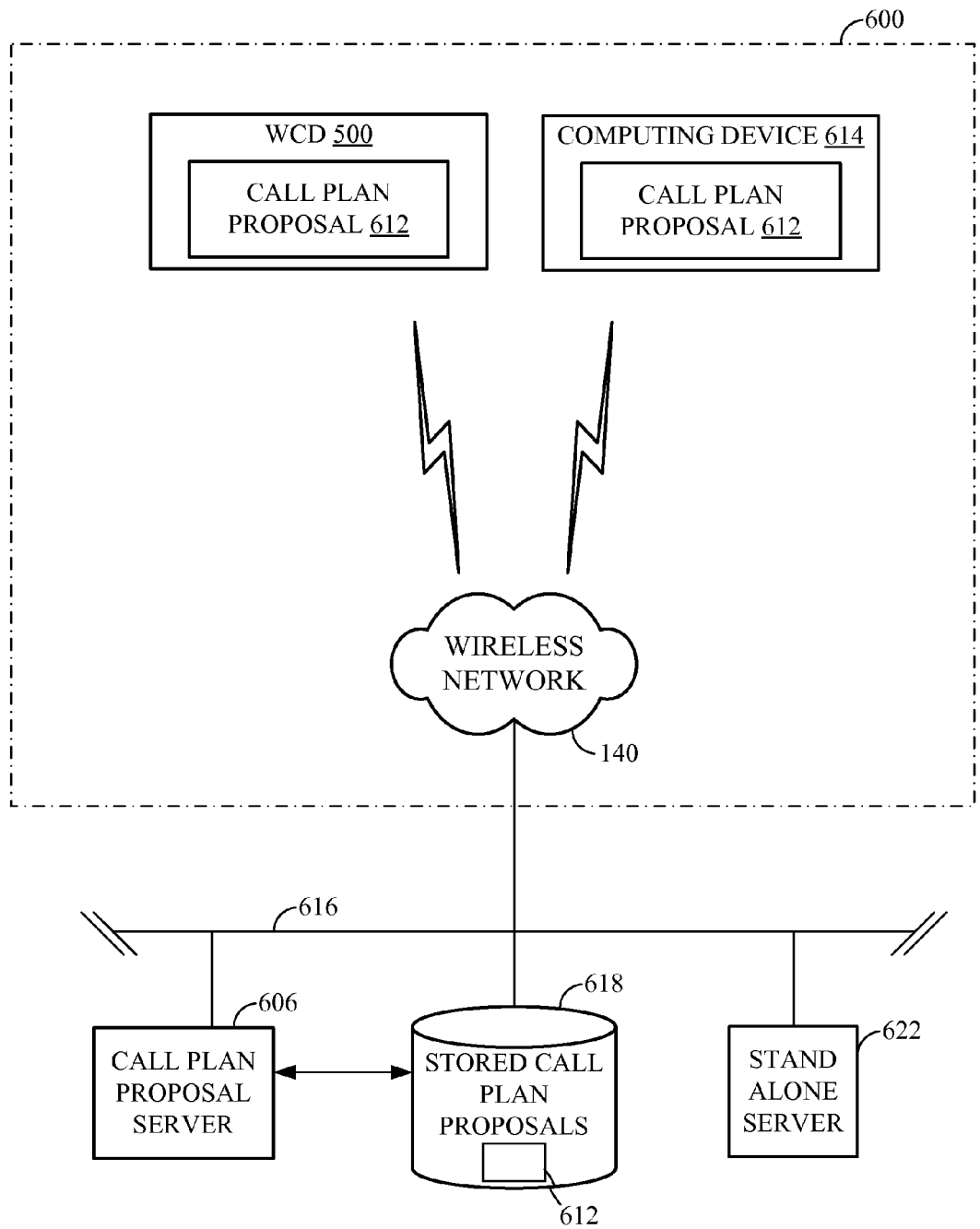
FIG. 6 depicts a block diagram of an exemplary network that can facilitate making calls in a source country outside of a home country, according to another aspect.

FIG. 6 depicts a block diagram of one exemplary aspect of wireless system 600. System 600 can contain client devices (e.g., wireless device 500), in communication across a wireless network 140 with at least one call plan proposal server 606 that selectively may transmit information relating to possible call plan proposals 612 to wireless devices, such as wireless devices 500, across a wireless communication portal or other data access to the wireless network 140. As shown here, the wireless client device can be a wireless device 500, such as but not limited to, a personal digital assistant, a personal navigation device, a pager, etc. and/or a separate computer platform 614 that has a wireless communication portal. For example, wireless device 500 includes a transceiver or wireless device for transmitting and receiving data, a processor for executing instructions and controlling operation of the wireless device, and a memory for storing the executable instructions, such as those related to possible call plan proposals 612. The aspects can thus be realized on any form of client device including a wireless communication portal, e.g., a wireless device, including without limitation, wireless modems, PCMCIA cards, personal computers, access terminals, telephones, or any combination or sub-combination thereof.

The call plan proposal server 606 is shown here on a network 616 with other computer elements in communication with the wireless network 140. There can be a stand-alone server 622, and each server can provide separate services and processes to the client devices 500, 614 across the wireless network 140. System 600 may also include at least one call plan proposal database 618 that holds possible call plan proposals 612, that are downloadable by the client devices 500, 614. However, those skilled in the art will appreciate that the configuration illustrated in FIG. 6 is merely exemplary. Accordingly, other aspects can include one or more servers that can each perform all the described functions and contain all necessary hardware and software, or can contain only selected functionality.

Figure 7:
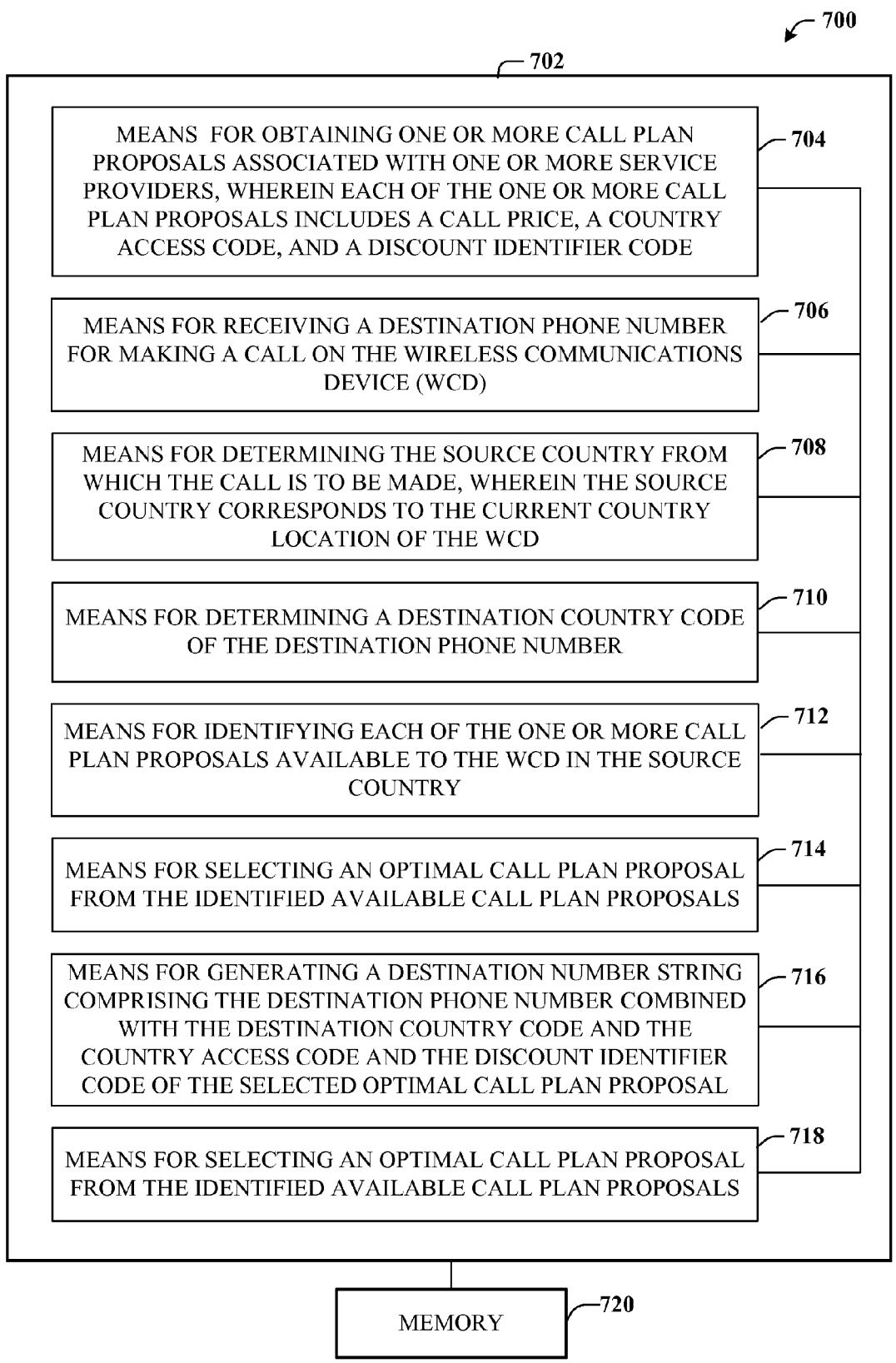
FIG. 7 depicts a block diagram of an exemplary communication system that can facilitate making calls in a source country outside of a home country, according to yet another aspect.

With reference to FIG. 7, illustrated is a system 700 for making calls from a wireless communications device in a source country outside of a home country, according to one aspect. For example, system 700 can reside at least partially within a base station, mobile device, etc. According to another exemplary aspect, system 700 can reside at least partially within an access terminal. It is to be appreciated that system 700 is represented as including functional blocks, which can be functional blocks that represent functions implemented by a processor, software, or combination thereof (e.g., firmware).

System 700 includes a logical grouping 702 of means that can act in conjunction. For instance, logical grouping 702 can include means for obtaining a plurality of call plan proposals associated with one or more service providers, wherein each call plan proposal includes a call price, a country access code, and a discount identifier code 704. For example, the call plan proposals may be obtained during an offline process in which one or more call plan proposals are inputted and made available for subsequent access without the need to re-enter the call plan proposal information during the subsequent access. Further, logical grouping 702 can include means for receiving a destination phone number for making a call on wireless communications device (WCD) 706. In one aspect, this number may be inputted by a user through a user interface on a WCD. In another aspect, this number may be obtained from an address book associated with a WCD.

Further, logical grouping 702 can comprise means for determining the source country from which the call is to be made, wherein the source country corresponds to the current country location of a WCD 708. In one aspect, determining a source country may include obtaining a country mapping table having a name of the source country mapped to an International Country Code (ICC), obtaining a cellular network identification (CNID) mapping table having the ICC mapped to one or more CNIDs corresponding to the source country, obtaining CNID data from a base station available to a WCD, such as base station 142, and determining the source country from the CNID data mapped to the ICC and further mapped to the source country. In another aspect, source country code information may be included in a received signal from a local base station. In yet another aspect, a user may provide the applicable source country code.

Additionally, logical grouping 702 can comprise means for determining a destination country code of the destination phone number 710. In one aspect, an address book coupled to a WCD may include a destination country code for a destination phone number. In another aspect, a destination country code may be inferred by the WCD through characteristics associated with the destination phone number. In yet another aspect, a user may provide the applicable destination country code. Further, logical grouping 702 can comprise means for identifying each of the plurality of call plan proposals available to the WCD in the source country, wherein each of the plurality of call plan proposals comprises a plan-specific discount identifier code 712. For example, information related to the one or more call plan proposals such as but not limited to, call price, such as a charge per unit of time, pre-paid minutes, availability in source country, etc. may be obtained. In another aspect, potential call plan proposals may be identified through reference to received signals from a base station. Such an aspect may be implemented similarly to how a neighbor set is transmitted to a WCD over a paging signal from an active base station, except that available call plan proposals may be provided to the WCD instead of possible neighboring base station information.

Further, logical grouping 702 can comprise means for selecting a call plan proposal from the identified available call plan proposals 714. For example, a call plan selection may be based at least in part on the call price, any pre-paid minutes available with a plan, a signal strength for a local base station related to a call plan, a quality of service metric for a call plan related to a local base station etc. In one aspect, a user may select among a list of potential call pan proposals. In another aspect, a default setting may allow a WCD to select the call plan proposal. Further, logical grouping 702 can comprise means for generating a destination number string comprising the destination phone number combined with the destination country code and the country access code and the discount identifier code of the selected call plan proposal 716. For example, a destination number may include a country access code, followed by a discount identifier followed by a destination country code followed by the destination phone number. In one aspect, the destination number string may include inserting one or more pauses within the destination number string. In such an aspect, the one or more pauses may be inserted between one or more of the combined codes and may prompt a WCD for an interaction. Additionally, a security code may be included in the generated number string when needed in conjunction with a discount identifier. Further, logical grouping 702 can comprise means for executing the call using the destination number string 718. In one aspect, the call is executed through use of the generated destination number string. In such an aspect, inserted pauses may prompt a user and/or a WCD to provide additional information to complete the intended call to the destination phone number.

Based at least in part on this information, options for making calls from a wireless communications device in a source country outside of a home country can be inferred. Additionally, system 700 can include a memory 720 that retains instructions for executing functions associated with the means 704, 706, 708, 710, 712, 714, 716, and 718. While shown as being external to memory 720, it is to be understood that one or more of the means 704, 706, 708, 710, 712, 714, 716, and 718 can exist within memory 720.

Figure 8:
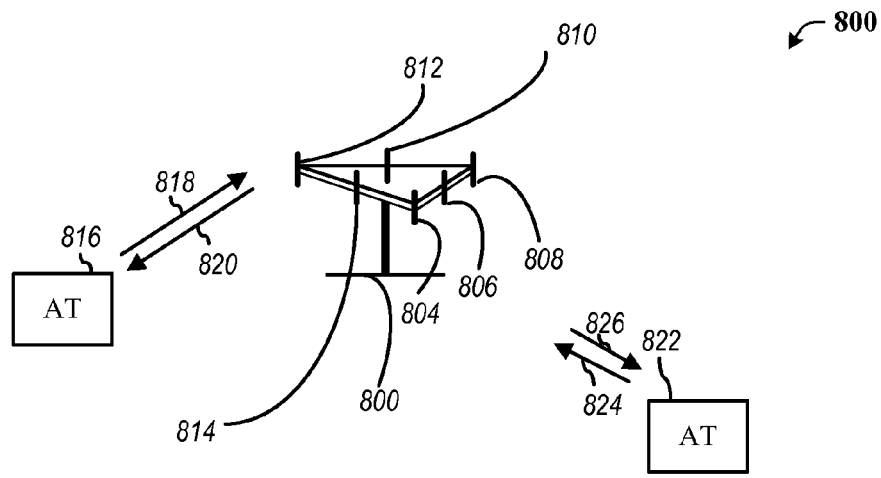
FIG. 8 illustrates an exemplary multiple access wireless communication system according to an aspect.

Referring to FIG. 8, a multiple access wireless communication system according to one aspect is illustrated. An access point 800 (AP) includes multiple antenna groups, one including 804 and 806, another including 808 and 810, and an additional including 812 and 814. In FIG. 8, only two antennas are shown for each antenna group, however, more or fewer antennas may be utilized for each antenna group. Access terminal 816 (AT) is in communication with antennas 812 and 814, where antennas 812 and 814 transmit information to access terminal 816 over forward link 820 and receive information from access terminal 816 over reverse link 818. Access terminal 822 is in communication with antennas 806 and 808, where antennas 806 and 808 transmit information to access terminal 822 over forward link 826 and receive information from access terminal 822 over reverse link 824. In a FDD system, communication links 818, 820, 824, and 826 may use different frequencies for communication. For example, forward link 820 may use a different frequency than that used by reverse link 818.

Each group of antennas and/or the area in which they are designed to communicate is often referred to as a sector of the access point. In the aspect, antenna groups each are designed to communicate to access terminals in a sector, of the areas covered by access point 800.

In communication over forward links 820 and 826, the transmitting antennas of access point 800 utilize beamforming in order to improve the signal-to-noise ratio of forward links for the different access terminals 816 and 824. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called user equipment (UE), a wireless communication device, terminal, or some other terminology.

Figure 9:
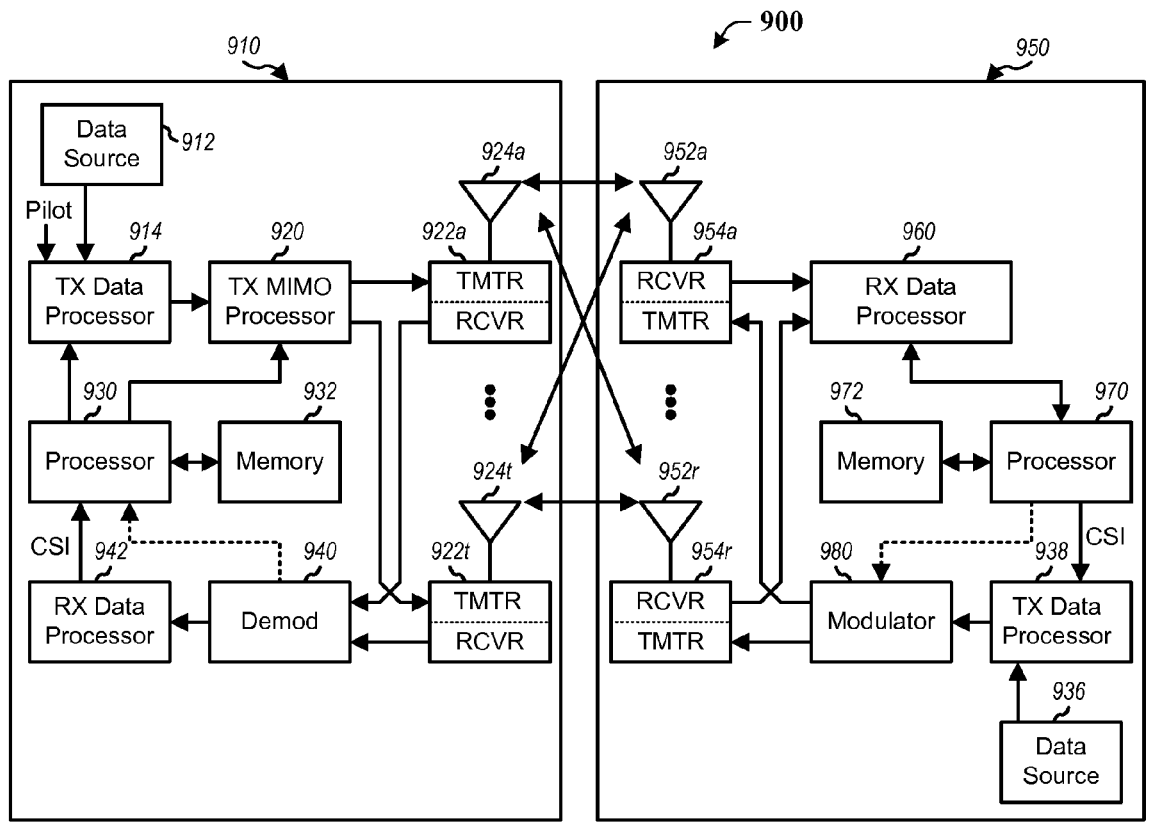
FIG. 9 depicts a block diagram of an exemplary communication system, according to one aspect.

Referring to FIG. 9, a block diagram of an aspect of a transmitter system 910 (also known as the access point) and a receiver system 950 (also known as access terminal) in a MIMO system 900 is illustrated. At the transmitter system 910, traffic data for a number of data streams is provided from a data source 912 to a transmit (TX) data processor 914.

In an aspect, each data stream is transmitted over a respective transmit antenna. TX data processor 914 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 930.

The modulation symbols for all data streams are then provided to a TX MIMO processor 920, which may further process the modulation symbols (e.g., for OFDM). TX MIMO processor 920 then provides $N_T$ modulation symbol streams to $N_T$ transmitters (TMTR) 922a through 922t. In certain aspects, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 922a through 922t are then transmitted from $N_T$ antennas 924a through 924t, respectively.

At receiver system 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective received signal, digitizes the conditioned signal to provide samples, and further processes the samples to provide a corresponding "received" symbol stream.

An RX data processor 960 then receives and processes the $N_R$ received symbol streams from $N_R$ receivers 954 based on a particular receiver processing technique to provide $N_T$ "detected" symbol streams. The RX data processor 960 then demodulates, deinterleaves, and decodes each detected symbol stream to recover the traffic data for the data stream. The processing by RX data processor 960 is complementary to that performed by TX MIMO processor 920 and TX data processor 914 at transmitter system 910.

A processor 970 periodically determines which pre-coding matrix to use (discussed below). Processor 970 formulates a reverse link message comprising a matrix index portion and a rank value portion.

The reverse link message may comprise various types of information regarding the communication link and/or the received data stream. The reverse link message is then processed by a TX data processor 938, which also receives traffic data for a number of data streams from a data source 936, modulated by a modulator 980, conditioned by transmitters 954a through 954r, and transmitted back to transmitter system 910.

At transmitter system 910, the modulated signals from receiver system 950 are received by antennas 924, conditioned by receivers 922, demodulated by a demodulator 940, and processed by a RX data processor 942 to extract the reserve link message transmitted by the receiver system 950. Processor 930 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH), and plurality of PHY channels. The PHY channels comprise a set of DL channels and UL channels. The DL PHY channels may comprise Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), or Paging Indicator Channel (PICH), Load Indicator Channel (LICH). The UL PHY Channels may comprise Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), or Broadband Pilot Channel (BPICH).

In an aspect, a channel structure is provided that preserves low PAR (at any given time, the channel is contiguous or uniformly spaced in frequency) properties of a single carrier waveform.

For the purposes of the present document, the present aspects may be applied to a Long Term Evolution (LTE) system, including components such as: an Evolved NodeB (E-NodeB), which has base station functionality; an Evolved UMTS Terrestrial Radio Access Network (E-UTRAN), which is the network that includes the E-NodeBs; and an Evolved Packet Core (EPC), also known as a System Architecture Evolution (SAE) core, which serves as the equivalent of GPRS networks via the Mobility Management Entity (MME), Serving Gateway (S-GW) and Packet Data Node (PDN) Gateway subcomponents.

The MME is a control-node for the LTE access-network. It is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 4G/3G access networks with the S3 interface terminating at the MME from the SGSN. The MME also terminates the S6a interface towards the home HSS for roaming UEs.

The SGW routes and forwards user data packets, while also acting as the mobility anchor for the user plane during inter-E-NodeB handovers and as the anchor for mobility between LTE and other 4GPP technologies (terminating S4 interface and relaying the traffic between 4G/3G systems and PDN GW). For idle state UEs, the SGW terminates the DL data path and triggers paging when DL data arrives for the UE. It manages and stores UE contexts, e.g. parameters of the IP bearer service, network internal routing information. It also performs replication of the user traffic in case of lawful interception.

The PDN GW provides connectivity to the UE to external packet data networks by being the point of exit and entry of traffic for the UE. A UE may have simultaneous connectivity with more than one PDN GW for accessing multiple PDNs. The PDN GW performs policy enforcement, packet filtering for each user, charging support, lawful Interception, and packet screening. Another role of the PDN GW is to act as the anchor for mobility between 4GPP and non-3GPP technologies such as WiMAX and 4GPP2 (CDMA 1X and EvDO).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 4GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 4" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for making calls from a wireless communications device in a source country outside of a home country, the method comprising:
   obtaining one or more call plan proposals associated with one or more service providers, wherein each of the one or more call plan proposals includes a call price, a country access code, and a discount identifier code;
   receiving a destination phone number for making a call on the wireless communications device (WCD) when the WCD is in the source country;
   determining the source country from which the call is to be made, wherein the source country corresponds to a current country location of the WCD;
   determining a destination country code of the destination phone number;
   identifying each of the one or more call plan proposals available to the WCD in the source country, wherein each of the one or more call plan proposals comprises a plan-specific discount identifier code;
   selecting a call plan proposal from the identified available call plan proposals;
   generating a destination number string comprising the destination phone number combined with the destination country code and the country access code and the discount identifier code of the selected call plan proposal; and
   executing the call using the destination number string.

2. The method of claim 1, further comprising:
   obtaining a security code associated with the discount identifier code; and
   wherein the generating further comprises combining the security code with the destination number string.

3. The method of claim 1, wherein the generating the destination number string further comprises inserting one or more pauses within the destination number string, wherein the pauses are inserted between one or more of the combined codes and prompt the WCD for an interaction.

4. The method of claim 1, wherein each country access code is unique to a service provider and a source country.

5. The method of claim 1, wherein each discount identifier code is unique to a service provider.

6. The method of claim 1, wherein the receiving the destination phone number further comprises receiving the destination phone number from an address book associated with the WCD, and wherein the address book includes the destination country code for the destination phone number.

7. The method of claim 1, wherein determining the source country further comprises at least one of obtaining latitude and longitude data for the WCD, or obtaining user inputted source country information.

8. The method of claim 1, wherein determining the source country further comprises:
   obtaining a country mapping table having a name of the source country mapped to an International Country Code (ICC);
   obtaining a cellular network identification (CNID) mapping table having the ICC mapped to one or more CNIDs corresponding to the source country;
   obtaining CNID data from a base station available to the WCD; and
   determining the source country from the CNID data mapped to the ICC and further mapped to the source country.

9. The method of claim 1, wherein the identifying further comprises:
   identifying call plan proposals available in the source country; and
   determining which of the available call plan proposals is available for communicating with the WCD.

10. The method of claim 1, wherein the identifying further comprises identifying call plan proposals available to communicate with the destination country.

11. The method of claim 1, wherein the call plan proposal is selected through a user selection, or the least expensive call price, or the call plan proposal with prepaid call time available, or the call plan proposal corresponding to a base station having the strongest signal strength, or any combination thereof.

12. The method of claim 1, further comprising:
   receiving a second destination phone number as part of a conference call enabled through the WCD;
   determining a second destination country code for the second destination phone number;
   selecting a call plan proposal from the identified available call plan proposals for the second destination phone number;
   generating a second destination number string comprising the second destination phone number combined with the second destination country code and a country access code and a discount identifier code of the second selected call plan proposal; and
   executing the call using the second destination number string.

13. At least one processor configured for making calls from a wireless communications device in a source country outside of a home country, the at least one processor comprising:
   a first module for obtaining one or more call plan proposals associated with one or more service providers, wherein each of the one or more call plan proposals includes a call price, a country access code, and a discount identifier code;
   a second module for receiving a destination phone number for making a call on the wireless communications device (WCD);
   a third module for determining the source country from which the call is to be made, wherein the source country corresponds to a current country location of the WCD;

a fourth module for determining a destination country code of the destination phone number;

a fifth module for identifying each of the one or more call plan proposals available to the WCD in the source country, wherein each of the one or more call plan proposals comprises a plan-specific discount identifier code;

a sixth module for selecting a call plan proposal from the identified available call plan proposals;

a seventh module for generating a destination number string comprising the destination phone number combined with the destination country code and the country access code and the discount identifier code of the selected call plan proposal; and an eighth module for executing the call using the destination number string.

14. A non-transitory computer-readable medium comprising:

at least one instruction for causing a computer to obtain one or more call plan proposals associated with one or more service providers, wherein each of the one or more call plan proposals includes a call price, a country access code, and a discount identifier code;

at least one instruction for causing the computer to receive a destination phone number for making a call on a wireless communications device (WCD);

at least one instruction for causing the computer to determine a source country from which the call is to be made, wherein the source country corresponds to a current country location of the WCD;

at least one instruction for causing the computer to determine a destination country code of the destination phone number;

at least one instruction for causing the computer to identify each of the one or more call plan proposals available to the WCD in the source country, wherein each of the one or more call plan proposals comprises a plan-specific discount identifier code;

at least one instruction for causing the computer to select a call plan proposal from the identified available call plan proposals;

at least one instruction for causing the computer to generate a destination number string comprising the destination phone number combined with the destination country code and the country access code and the discount identifier code of the selected call plan proposal; and at least one instruction for causing a computer to execute the call using the destination number string.

15. An apparatus, comprising:

means for obtaining one or more call plan proposals associated with one or more service providers, wherein each of the one or more call plan proposals includes a call price, a country access code, and a discount identifier code;

means for receiving a destination phone number for making a call on a wireless communications device (WCD);

means for determining a source country from which the call is to be made, wherein the source country corresponds to a current country location of the WCD;

means for determining a destination country code of the destination phone number;

means for identifying each of the one or more call plan proposals available to the WCD in the source country, wherein each of the one or more call plan proposals comprises a plan-specific discount identifier code;

means for selecting a call plan proposal from the identified available call plan proposals;

means for generating a destination number string comprising the destination phone number combined with the destination country code and the country access code and the discount identifier code of the selected call plan proposal; and means for executing the call using the destination number string.

16. An apparatus, comprising:

a storage module;

a processor coupled to the storage module configured to obtain one or more call plan proposals associated with one or more service providers, wherein each of the one or more call plan proposals includes a call price, a country access code, and a discount identifier code; and a user interface coupled to the processor and the storage module configured to receive a destination phone number for making a call on the wireless communications device (WCD);

wherein the processor is further configured to:
determine a destination country code of the destination phone number;
identify each of the one or more call plan proposals available to the WCD in the source country, wherein each of the one or more call plan proposals comprises a plan-specific discount identifier code;
select a call plan proposal from the identified available call plan proposals;
generate a destination number string comprising the destination phone number combined with the destination country code and the country access code and the discount identifier code of the selected call plan proposal; and
execute the call using the destination number string.

17. The apparatus of claim 16, wherein the processor is further configured to:
obtain a security code associated with the discount identifier code; and
combine the security code with the destination number string.

18. The apparatus of claim 16, wherein the processor is further configured to:
insert one or more pauses within the destination number string, wherein the pauses are inserted between one or more of the combined codes and prompt the WCD for an interaction.

19. The apparatus of claim 16, wherein each country access code is unique to a service provider and a source country.

20. The apparatus of claim 16, wherein each discount identifier code is unique to a service provider.

21. The apparatus of claim 16, wherein the processor is further configured to receive the destination phone number from an address book associated with the WCD, and wherein the address book includes the destination country code for the destination phone number.

22. The apparatus of claim 16, wherein the processor is further configured to use at least one of obtaining latitude and longitude data for the WCD, or obtaining user inputted source country information in determining the source country.

23. The apparatus of claim 16, wherein the processor is further configured to:
obtain a country mapping table having a name of the source country mapped to an International Country Code (ICC);
obtain a cellular network identification (CNID) mapping table having the ICC mapped to one or more CNIDs corresponding to the source country;

obtain CNID data from a base station available to the WCD; and determine the source country from the CNID data mapped to the ICC and further mapped to the source country.

24. The apparatus of claim 16, wherein the processor is further configured to:

identify call plan proposals available in the source country; and determine which of the available call plan proposals is available for communicating with the WCD.

25. The apparatus of claim 16, wherein the processor is further configured to identify call plan proposals available to communicate with the destination country.

26. The apparatus of claim 16, wherein the call plan proposal is selected by a user selection, or a least expensive call price, or the call plan proposal with prepaid call time available, or the call plan proposal corresponding to a base station having the strongest signal strength, or any combination thereof.

27. The apparatus of claim 16, wherein the user interface is further configured to receive a second destination phone number as part of a conference call enabled through the wireless communications device (WCD); and the processor is further configured to:

determine a second destination country code for the second destination phone number;

select a call plan proposal from the identified available call plan proposals for the second destination phone number; and generate a second destination number string comprising the second destination phone number combined with the second destination country code and a country access code and a discount identifier code of the second selected call plan proposal; and the user interface is further configured to execute the second call using the second destination number string.

28. A method for facilitating calls from a wireless communications device (WCD):

receiving, from a user, one or more call plan proposals associated with one or more service providers, wherein each of the one or more call plan proposals includes a call price, a country access code, and a discount identifier code;

generating a call plan proposal database from the received call plan proposals, wherein the database is indexed by source country; and transmitting information associated with the call plan proposal database to a WCD for access when the WCD is in a source country.

29. The method of claim 28, wherein each country access code is unique to a service provider and a source country.

30. The method of claim 28, wherein each discount identifier code is unique to a service provider.

31. At least one processor configured to facilitate calls from a wireless communications device (WCD), the at least one processor comprising:

a first module configured to receive, from a user, one or more call plan proposals associated with one or more service providers, wherein each of the one or more call plan proposals includes a call price, a country access code, and a discount identifier code;

a second module configured to generate a call plan proposal database from the received call plan proposals, wherein the database is indexed by source country; and a third module configured to transmit information associated with the call plan proposal database to a WCD for access by the WCD when the WCD is in a source country.

32. A non-transitory computer-readable medium comprising:

at least one instruction for causing a computer to receive, from a user, one or more call plan proposals associated with one or more service providers, wherein each of the one or more call plan proposals includes a call price, a country access code, and a discount identifier code;

at least one instruction for causing a computer to generate a call plan proposal database from the received call plan proposals, wherein the database is indexed by source country; and at least one instruction for causing a computer to transmit information associated with the call plan proposal database to a wireless communications device (WCD) for access by the WCD when the WCD is in a source country.

33. An apparatus, comprising:

means for receiving, from a user, one or more call plan proposals associated with one or more service providers, wherein each of the one or more call plan proposals includes a call price, a country access code, and a discount identifier code;

means for generating a call plan proposal database from the received call plan proposals, wherein the database is indexed by source country; and means for transmitting information associated with the call plan proposal database to a wireless communications device (WCD) for access by the WCD when the WCD is in a source country.

34. An apparatus, comprising a storage module;

a receiver coupled to the storage module configured to receive, from a user, one or more call plan proposals associated with one or more service providers, wherein each of the one or more call plan proposals includes a call price, a country access code, and a discount identifier code;

a processor coupled to the storage module configured to generate a call plan proposal database from the received call plan proposals, wherein the database is indexed by source country; and a transmitter coupled to the storage module configured to transmit information associated with the call plan proposal database to a wireless communications device (WCD) for access by the WCD when the WCD is in a source country.

35. The apparatus of claim 34, wherein each country access code is unique to a service provider and a source country.

36. The apparatus of claim 34, wherein each discount identifier code is unique to a service provider.

* * * * *